United States Patent
Decker (10) Patent No.: US 6,264,712 B1
(45) Date of Patent: Jul. 24, 2001

(54) LOW INTAKE RESTRICTION AIR PRECLEANER

(75) Inventor: William K. Decker, Cambridge, WI (US)

(73) Assignee: American Farm Implement & Specialty, Inc., Janesville, WI (US)

( * ) Notice: Subject to any disclaimer, the term of this patent is extended or adjusted under 35 U.S.C. 154(b) by 0 days.

(21) Appl. No.: 09/491,169

(22) Filed: Jan. 25, 2000

Related U.S. Application Data (63) Continuation-in-part of application No. 09/287,855, filed on Apr. 7, 1999, now abandoned.

(51) Int. Cl.$^7$ .................................................. B01D 45/12
(52) U.S. Cl. ........................... 55/456; 55/445; 55/448; 55/449; 55/457
(58) Field of Search .................................. 55/385.2, 404, 55/445, 448, 449, 452, 456, 457

(56) References Cited

U.S. PATENT DOCUMENTS

| D. 422,069 | 3/2000 | Decker . |
| 1,641,746 | 9/1927 | Donaldson . |
| 1,870,216 | 8/1932 | Baldwin . |

(List continued on next page.)

FOREIGN PATENT DOCUMENTS

| 683986 | 6/1930 | (FR) . |
| 483058 | 7/1953 | (IT) . |

OTHER PUBLICATIONS

Advertising for Best–Ex Centri Air Pre–Cleaners, by Best–Ex, Inc. before 1990.
Photocopy of cutaway view of the Centri Air Pre–Cleaner sold by Best–Ex, Inc.
Advertisement, Price List and Specifications for Turbo® Pre–Cleaners by Sureco, Mar. 1, 1987.
Advertisement for Turbo® III Precleaners by Dreison International, 1999.
Brochure entitled "ENGINAIRE," 1998, descibing air precleaners on the market in the United States more than one year before the filing date of the present application.
Kate Miller, "Sy–Klone Makes the Best Better," OEM Off Highway, Jan. 1996, pp. 34, 36.
U.S. Patent application Ser. No. 29/091,054, filed Jul. 22, 1998, by Wiliam K. Decker for Air Precleaner.
U.S. Patent Application (serial no. not yet known) filed Nov. 19, 1999 by Charles Stolberg, Jr. and William Decker, entitled "Multiple Stage Air–Intake Filter Apparatus".

*Primary Examiner*—David A. Simmons
*Assistant Examiner*—Minh-Chau T. Pham
(74) *Attorney, Agent, or Firm*—Foley & Lardner

(57) ABSTRACT

An air precleaner includes a base assembly, a hood mounted to the base assembly and spaced from the base assembly to define a circumferential gap, and a rotor assembly mounted for rotation within the air space between the hood and base assembly. The base assembly has an outlet port that is connectable to an engine intake. Inlet ports may be formed between web supports connecting an outer circumferential wall to an inner circumferential wall of the base assembly. A series of vanes are mounted in the gap between the hood and base assembly at an angle between radial and tangential to define channels between them through which air is directed into the air space between the hood and base assembly with both an inward and tangential component of velocity. The air drawn in through the channels between the vanes provides a strong tangential component of air velocity impacting upon the rotor to maintain high efficiency of particulate removal. The additional air drawn in through the channels at the gap between the hood and base assembly significantly reduces the restriction of air drawn in through the precleaner as compared to conventional precleaner designs in which air enters only through inlet ports formed at the bottom of the precleaner. The bottom of the air precleaner may be closed so that intake air enters the precleaner only through the channels around the periphery of the precleaner, allowing the precleaner to be mounted on or adjacent to other surfaces.

43 Claims, 7 Drawing Sheets

U.S. PATENT DOCUMENTS

| | | |
|---|---|---|
| 2,193,479 | 3/1940 | Donaldson . |
| 2,304,778 | 12/1942 | Cresswell . |
| 2,417,130 | 3/1947 | Russell . |
| 2,973,830 | 3/1961 | Gruner . |
| 3,552,102 | 1/1971 | Araki . |
| 3,563,004 * | 2/1971 | Schouw ................................. 55/456 |
| 3,670,480 | 6/1972 | Petersen . |
| 3,740,932 | 6/1973 | Bersheim . |
| 3,791,112 | 2/1974 | Lidstone . |
| 3,877,907 | 4/1975 | Elliff . |
| 3,973,937 | 8/1976 | Petersen . |
| 4,013,137 | 3/1977 | Petersen . |
| 4,135,897 | 1/1979 | Gondek . |
| 4,138,761 | 2/1979 | Nauta . |
| 4,197,102 | 4/1980 | Decker . |
| 4,201,557 | 5/1980 | Peterson . |
| 4,248,613 * | 2/1981 | Linhart ................................. 55/456 |
| 4,373,940 | 2/1983 | Peterson . |
| 4,382,804 | 5/1983 | Mellor . |
| 4,459,141 | 7/1984 | Burrington et al. . |
| 4,547,207 | 10/1985 | Petersen . |
| 5,022,903 | 6/1991 | Decker . |
| 5,059,222 | 10/1991 | Smith . |
| 5,449,391 | 9/1995 | Decker . |
| 5,505,756 | 4/1996 | Decker . |
| 5,656,050 | 8/1997 | Moredock . |
| 5,766,315 | 6/1998 | Moredock . |
| 5,837,020 | 11/1998 | Caretellone . |

* cited by examiner

LOW INTAKE RESTRICTION AIR PRECLEANER

This application is a continuation-in-part of prior application Ser. No. 09/287,855, filed Apr. 7, 1999, now abandoned.

FIELD OF THE INVENTION

This invention relates generally to devices for separating particulates from the air such as dirt, dust, rain, and snow before they enter the air stream of an engine, air compressor, or similar apparatus.

BACKGROUND OF THE INVENTION

Air precleaners are devices typically used in the removal of dust, dirt, sand, rain, snow, and other airborne particulates in the air prior to the flow of air to the carburetor of an internal combustion engine. Such precleaners promote more efficient combustion and longer engine and filter life. The efficiency of the precleaner is determined by the percentage of particulates that are removed from the intake air by the precleaner. The more efficient the precleaner, the lesser the amount of particulates that must be removed by the air filter.

The precleaners of the prior art have various configurations that are employed as a means of removing the particulates from the air. Examples of precleaners or particle separators are shown in U.S. Pat. Nos. 2,193,479; 2,304,778; 2,417,130; 2,973,830; 3,552,102; 3,670,480; 3,740,932; 3,791,112; 3,973,937; 4,138,761; 4,197,102; 4,547,207; 5,022,903; 5,449,391; and 5,505,756.

Although such precleaners may adequately perform with respect to particulate removal, this is sometimes accomplished at the expense of a reduced air flow, i.e., the precleaner itself may become an air restriction. There is generally a trade-off between efficiency of particulate renewal and air intake restriction. Continuing efforts have been made to develop air precleaners that efficiently remove particulates from the air with less air restriction.

SUMMARY OF THE INVENTION

An air precleaner in accordance with the present invention provides high efficiency removal of particulates from intake air while significantly reducing the air flow restriction encountered in the conventional prior air precleaners. The air precleaner of the invention includes a base assembly having an inlet port through which air enters and an outlet port through which air exits the precleaner, and a hood mounted to the base assembly which has a discharge port for discharging particulates, with the hood and base assembly defining an air space so that the air space and the inlet and outlet ports and the discharge port are in fluid communication. The hood is spaced from the base assembly to define a circumferential gap and a series of vanes are mounted in the gap at an angle between radial and tangential to define channels between them through which air is directed into the air space. A rotor assembly is rotatably mounted within the air space and rotates when air enters through the inlet port to fling particulates outwardly toward the hood for expulsion through the discharge port.

The vanes in the series of vanes are preferably equally spaced from one another around the periphery of the gap between the hood and base assembly to define inwardly converging channels between the vanes, and each vane is preferably although not necessarily formed as a flat plate. A flange may extend from a periphery of the hood at the gap to which the vanes are attached to further enclose the channels defined by the vanes and the flange. Preferably, the rotor assembly is mounted to the inside of the hood at a position above the position of the gap between the hood and base assembly. The base assembly may further comprise an inner circumferential wall that defines the outlet port and terminates in an inner end, and an outer circumferential wall that is connected to the inner circumferential wall by web supports, with a plurality of inlet ports being defined by the web supports and with the web supports angled to direct air upon the rotor assembly to cause it to rotate. The gap between the hood and base assembly is preferably at a position at least partially below the inner end of the wall that defines the outlet port.

As air is drawn into the precleaner as a result of the vacuum draw from the engine, etc., to which the precleaner is attached, the moving air passing through the inlet ports drives the rotor assembly to rotate and fling particles outwardly toward the inner surface of the hood. These particles are driven by centrifugal force along the inner surface of the hood until they exit through the discharge port, which may be formed as a vertical slot in a cylindrical side wall of the hood or in other conventional configurations. The side air injection in accordance with the present invention that is directed by the vanes through the gap provides inward and tangential air flow components that are added to the air flow from the inlet ports, causing a relatively free flow of air into the air precleaner with minimal restriction. The vanes are preferably mounted at an angle to a tangent to the periphery of the air precleaner which is selected to provide a desired tangential component of air flow, and adjacent vanes converge inwardly toward one another to define inwardly converging channels between them, thus increasing the air flow velocity of the air entering through the channels into the air space between the hood and the base assembly. The tangential component of velocity of the air injected through the channels between the vanes adds to the upward and tangential air flow from the inlet ports, thereby providing increased tangential velocity of the air that impacts upon the rotor, enhancing the rotational velocity of the rotor. In this manner, high efficiency of particulate removal is maintained in the air precleaner while substantially reducing the restriction of air flow into and through the air precleaner into the engine.

The air precleaner may be formed so that all of the intake air passes into the air space through the gap in which are mounted the vanes which define channels between them through which air is directed into the air space. The channels direct the air into the air space with a tangential velocity component that impacts against the rotor assembly to drive the rotor in the desired direction of rotation. The bottom of the air cleaner may be closed off to completely enclose the air space within the air cleaner except for the air inlet at the gap through the channels between the vanes and the air outlet through the outlet port. The base assembly may include an inner circumferential wall that defines the outlet port and that terminates in an inner end, with the bottom of the air cleaner being closed off by a plate that extends from the inner circumferential wall to the vanes at the gap. The vanes may be attached to a flange that extends outwardly from the periphery of the hood at the gap. The flange with vanes attached thereto may be formed as a separate part that is assembled into place in the gap as the hood is mounted to the base assembly. A plurality of flanges with vanes attached thereto may be mounted in stacked relation in the gap and be assembled in place. In this manner, the total effective area of air intake to the air precleaner, which is related to the effective restriction of air entering the precleaner, can be selected by selecting the desired number of flanges with vanes attached thereto that are mounted in stacked relation at the gap. A further advantage of the air precleaner in which the intake air enters only circumferentially and not through the bottom of the air precleaner is that the precleaner may be mounted very close to or even in contact with other surfaces, such as the hood of a vehicle, to thereby minimize the overall profile of the air precleaner and the space that it occupies.

Further objects, features, and advantages of the invention will be apparent from the following detailed description when taken in conjunction with the accompanying drawings.

DETAILED DESCRIPTION OF THE INVENTION

With reference to the drawings, FIGS. 1–5 show various views of the air precleaner of the present invention generally at 10. The air precleaner 10 comprises a base assembly 12 having air inlet ports 14 and an air outlet port 16, a hood 18 positioned above the base assembly 12, and a rotor assembly 20 that is rotatably mounted in the interior of the precleaner 10. The precleaner 10 is a device used for separating particulates from a carrier fluid. Where the carrier fluid is air, exemplary particulates include dust, dirt, sand, rain, snow, or any other airborne particulate matter. The base assembly 12 is formed, e.g., preferably molded of plastic such as glass filled acetyl plastic, in a single piece to include an outer circumferential wall 22, an inner circumferential wall 24, and a plurality of web segments 28 joining the inner and outer walls. The outer circumferential wall 22 has a top edge 32 and a bottom edge 34. The inner circumferential wall 24 has an inner or top end 36 (shown in FIG. 5) and an outer or bottom end 38. The web segments 28 connect the outer circumferential wall 22 to the inner circumferential wall 24 and, by their arrangement between the outer and inner circumferential walls 22 and 24, form the air inlet ports 14 that provide fluid communication from the exterior of the precleaner 10 to the interior of the precleaner 10. In the orientation shown in FIG. 1, each of the web segments 28 is angled from a low first edge 41 to a high second edge 43, the second edge 43 being located counterclockwise from the first edge 41 when the precleaner is in its normal upright position. The web segments are thus successively arranged in counterclockwise fashion in the area formed between the outer circumferential wall 22 and the inner circumferential wall 24. Each of the air inlet ports 14 are formed and bounded by the second edge 43 of one web support 28 and the first edge 41 of the succeeding counterclockwise web support 28. The air inlet ports 14 are also bounded by the outer circumferential wall 22 and the inner circumferential wall 24. Struts 44 are preferably formed across the inlet ports 14 for reinforcement of the web segments and to inhibit insertion of fingers or other objects into the ports. There are six air inlet ports 14 in the precleaner 10 as depicted in the figures, although other numbers of ports are possible. The ports 14 are angled so that fluid is drawn in from the exterior of the precleaner 10 and directed at the rotor assembly 20.

The inner circumferential wall 24 defines the air outlet port 16, with the bottom or outer end 38 of the inner circumferential wall 24 extending below the bottom 34 of the outer circumferential wall 22. The outlet port 16 is typically connected and fitted to the air intake of an engine, air compressor, or similar apparatus, so that the precleaner 10 acts to pre-clean the air prior to its entry to the apparatus. The operation of the precleaner 10 will be described in further detail below. The inner circumferential wall 24 preferably has longitudinal slots 40 that extend upward from the bottom end 38 of the inner circumferential wall 24 so that the inner circumferential wall 24 may be more easily fitted over the top of the air intake of the engine, air compressor, or similar apparatus. For operational use a clamp or band (not shown) is preferably wrapped circumferentially about the inner circumferential wall 24 in the region of the longitudinal slots 40 and tightened to tightly secure the inner circumferential wall about the air intake pipe of the engine, air compressor, or similar apparatus.

Figure 5:
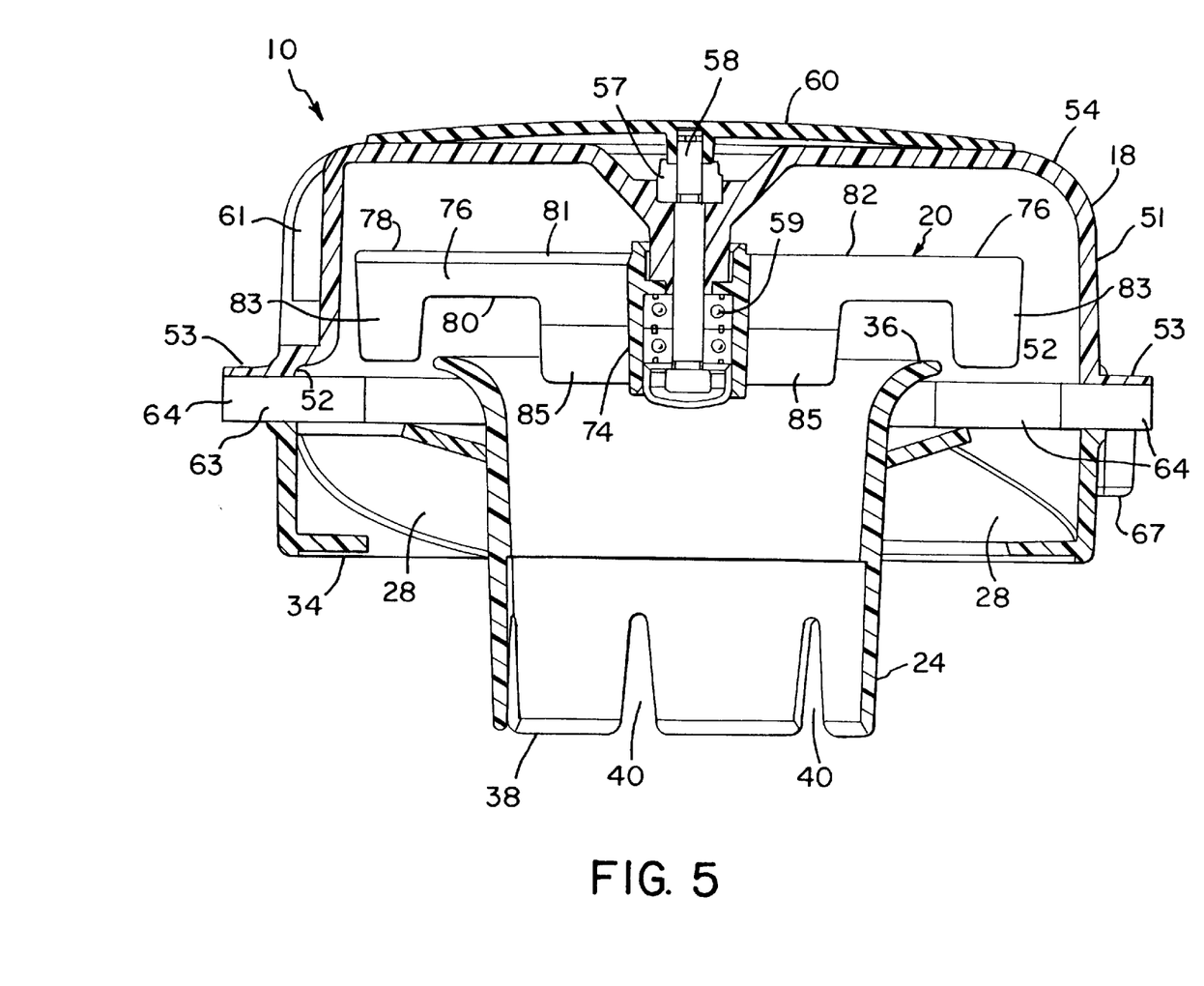
FIG. 5 is a cross-sectional view of the air precleaner of the invention taken generally along the lines 5—5 of FIG. 2.

The hood 18 preferably has a cylindrical side wall 51, terminating at a peripheral bottom edge 52, and a flange 53 that extends outwardly from the bottom edge 52. The hood 18 also has a top 54, which may be substantially flat and circular as shown, and which may be integrally joined to the cylindrical side wall 51. For example, the various parts of the hood may be integrally molded of plastic. The rotor 20 may be mounted to the top 54 of the hood 18 as shown in FIG. 5, e.g., with a nut 57 engaging a bolt 58 which supports the bearing 59 on which the rotor assembly is mounted for rotation. The center of the top 54 may be depressed so that the nut 57 and the end of the bolt are enclosed within the depression, and a cover 60 (e.g., of rubber or flexible plastic) may be secured to the top 54 to cover the exposed nut 57. The hood 18 has a particulates discharge port 61 formed therein, e.g., as an indented vertical slot in the side wall 51 that faces counterclockwise outwardly. The hood 18 encloses the upper surface of the base assembly 12 and defines an air space with the base assembly 12 so that the air space and the inlet and outlet ports 14 and 16 and the discharge port 61 are in fluid communication. The hood is mounted to the base assembly such that the peripheral bottom edge 52 of the hood is spaced from the base assembly to define a circumferential gap 63 in which a series of vanes 64 are mounted. The hood 18 may be attached to the base assembly 12 by bolts 66 that extend from bosses 67 formed on the base assembly flange 53 to thread into tapped receptacles 68 on the hood 18. The vanes 64 are preferably attached to the flange 53 (e.g., being integrally molded therewith) and extend into the gap 63 between the hood 18 and base assembly 12 at an angle that is between radial and tangential, and are preferably formed as flat plates as shown.

Thus, the vanes 64 are part of the hood in this embodiment, although it is understood that the vanes may be formed as part of the base assembly 12, or as a separate unit that fits between the hood and the base assembly.

The rotor assembly 20 comprises a hub 74 mounted to the bearing 59, with four arms 76 extending radially therefrom, the arms 76 being equal distant from each other to form an "x"-type configuration. It is also possible that more or less than four arms 76 may be used. A preferred rotor assembly is of the type generally shown and described in Pat. Nos. 5,449,391 and 5,505,756. Each of the arms has a first blade 78 and a second blade 80. The first blades 78 are in a plane radial to the hub 74, that is, a plane perpendicular to the axis of rotation of the rotor, and the second blades 80 are preferably in planes axial to the hub 74, that is, planes parallel to and preferably coincident with the axis of rotation. The first blade 78 has a leading edge 81 and a trailing edge 82, wherein the leading edge 81 precedes the trailing edge 82 as each arm 76 moves along its circular path of rotation. The first blade 78 is preferably wedge shaped, being widest at the position at which it joins the hub 74 and tapering to a terminus of the leading edge 81 at a position adjacent to paddles 83 formed at the outer ends of the arms. The second blade 80 descends preferably perpendicularly from the trailing edge of the first blade 78 and has a front side and a back side. In a base assembly 12 that is designed to create a counterclockwise rotor assembly 20 rotation, the first blade 78 protrudes from the front side of the second blade 80 in a counterclockwise direction, whereas the backside of the second blade is free of obstruction, and thus air flowing past the back side is substantially unobstructed.

Each of the arms 76 also preferably has an integrally formed tab 85 that extends downwardly from the axial blade 80 in a manner as depicted in FIG. 5. The tabs 85 extend downwardly toward the throat of the air outlet port proximate the hub 74 and may be slightly bent or flared in a clockwise direction. The tabs 85 may also extend downwardly from the axial blade 80 in the axial plane, i.e., without a bend. A bent tab can be advantageous at high altitudes, where the angle of the tabs 85 may be increased to compensate for the lower intake air pressure and thereby maintain the rotational speed of the rotor assembly 20 at a desired high rate despite the low air density. It may be desirable for the length of the tabs 85 to be selected for different applications. The size of the tabs 85 is related to the speed of the rotor assembly 20, which correspondingly affects the efficiency of the precleaner 10 for different altitudes of operation. In higher altitude applications, for example, longer tabs 85 are preferable. The paddles 83 provide increased surface area to meet the air drawn in from the air inlet ports 14, and thereby better utilize the force of the inlet airflow, and can help increase the rotational speed of the rotor assembly 20 and impel particulates toward the inner surface of the hood 12 where the particulates move along the inner surface until exiting through the discharge port 61 in the side wall 51 of the hood. The paddles 83 also add mass to each of the arms 76 and thereby increase the moment of inertia of the rotor assembly, helping to maintain a uniform rotational speed of the rotor assembly 20.

Figure 1:
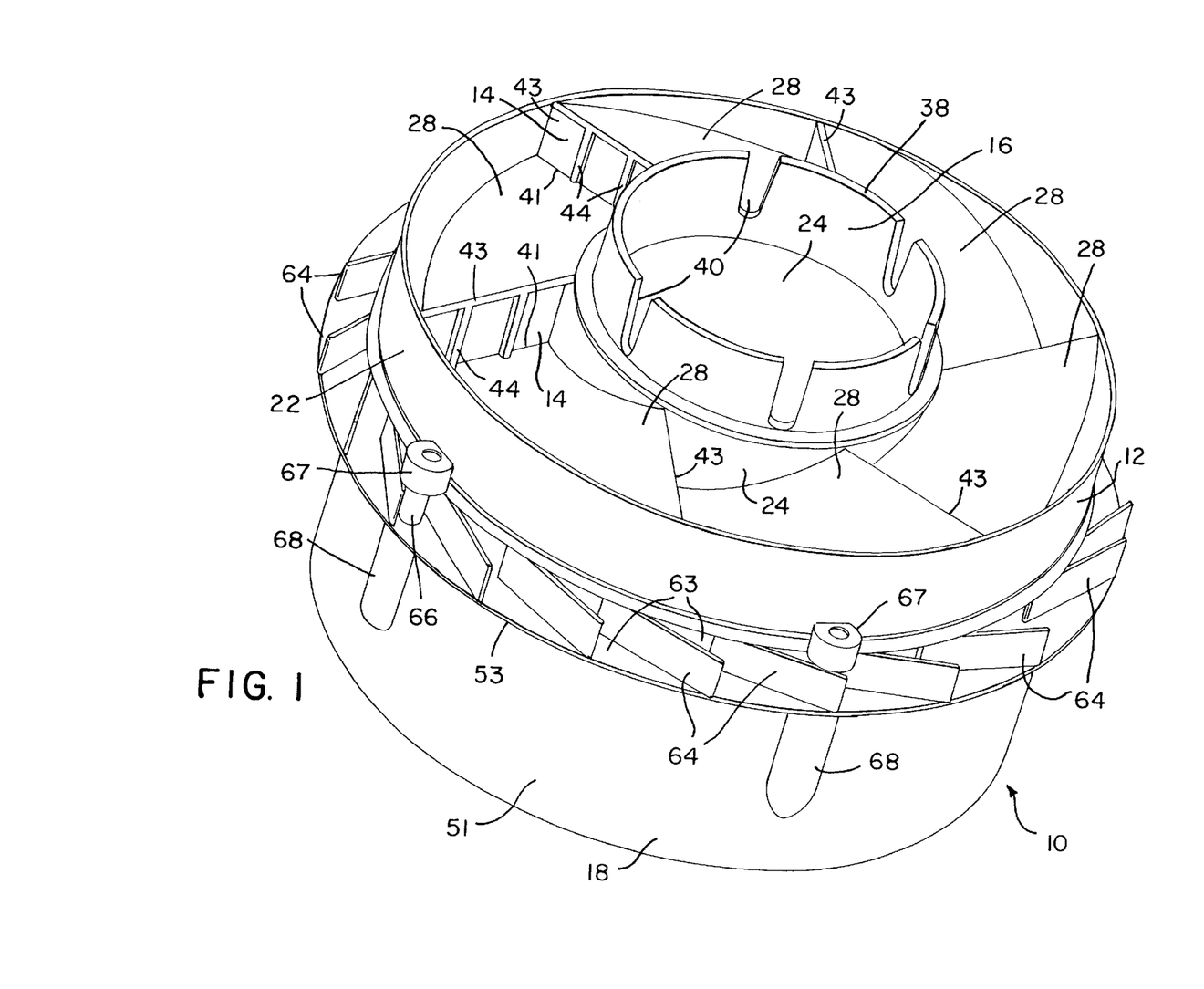
FIG. 1 is a perspective view of the air precleaner of the present invention.
Figure 2:
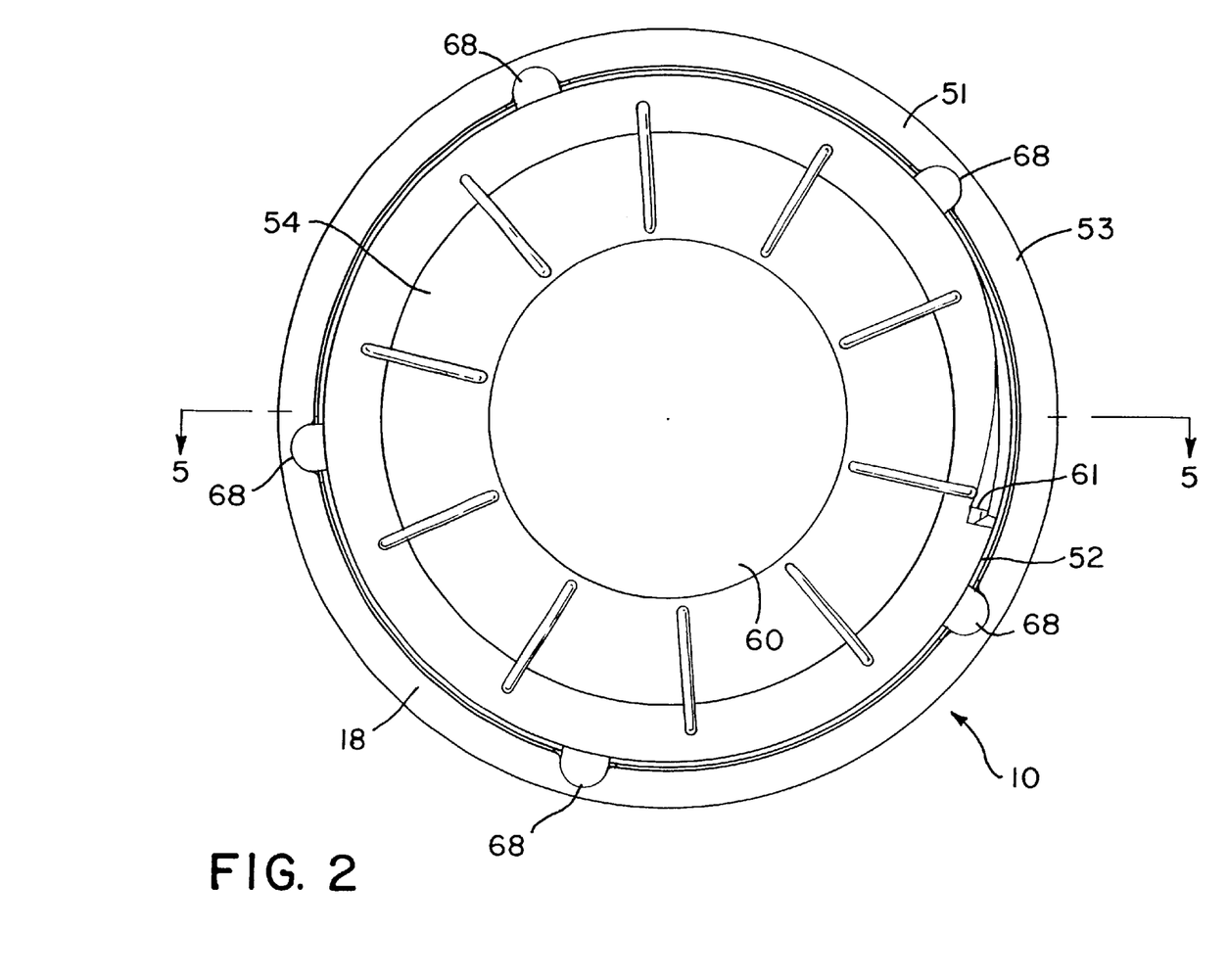
FIG. 2 is a top view of the air precleaner of the invention.
Figure 3:
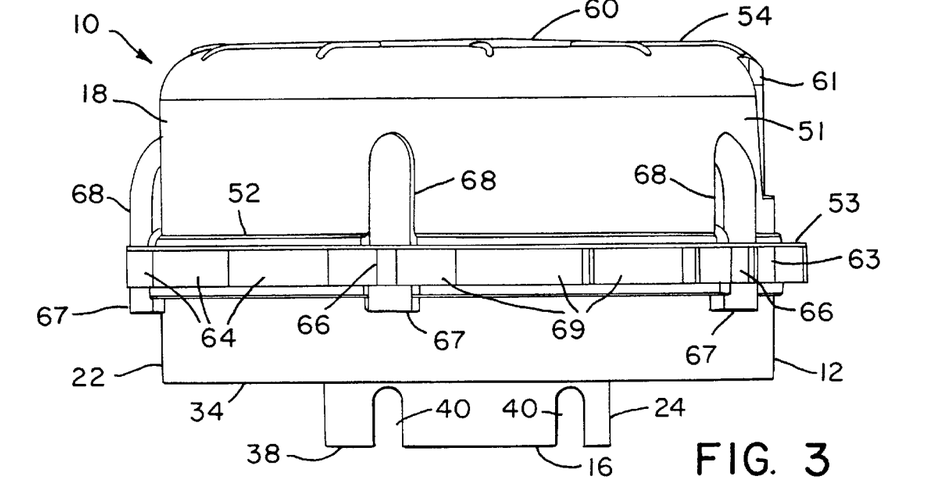
FIG. 3 is a side view of the air precleaner of the invention.
Figure 4:
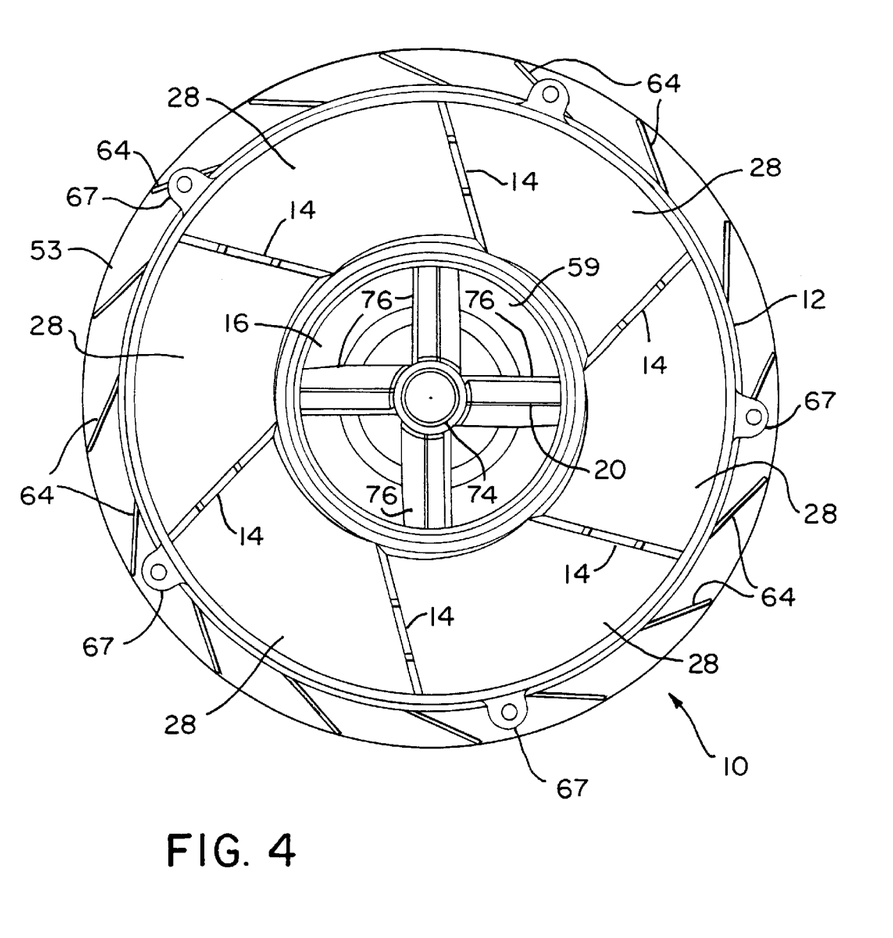
FIG. 4 is a bottom view of the air precleaner of the invention.

Each of the vanes 64 in the series is preferably spaced uniformly from adjacent vanes around the gap between the hood and base assembly to define air channels between adjacent vanes 64 that provide side air injection. The vanes preferably extend between the bottom edge 52 of the hood and the outer peripheral edge of the flange 53. For example, the vanes may be oriented at an angle of about 35° with respect to a tangent to the circular periphery of the hood (e.g., the periphery of the flange 53), although larger or smaller angles may be utilized (e.g., 20° to 60° or more). The vanes direct air inwardly and tangentially, with the tangential component of air velocity in the same direction as the tangential component of air introduced through the inlet ports 14, e.g., clockwise when viewing the bottom of the base assembly as in FIG. 4, and counterclockwise when viewing the air precleaner in its normal upright position. The width of the gap 63 is selected to allow introduction of sufficient wall injected air to reduce restriction while not substantially affecting the efficiency of removal of particulates; e.g., a gap of about 0.5 inch has been found satisfactory for precleaners of typical dimensions (e.g., hood and base diameter of about 9 inches). The number of vanes 64 in the series is preferably selected to provide the desired side wall air flow, tangential and inward velocity, and pressure drop. As shown in FIG. 4 and for exemplary dimensions of 0.5 inch gap, 9 inch hood diameter, and 35° vane angle, 16 vanes have been found suitable. As shown in FIG. 5, the gap is preferably located below the rotor assembly 20 so that side wall injected air passing through the gap does not directly impinge on the rotor assembly 20. Preferably the inner end 36 of the inner wall 24 (which is preferably flared out at the top as shown in FIG. 5) is at least in part above the gap 63 so that inwardly moving air from the gap is blocked by the wall 24 and does not pass directly into the outlet port. As best illustrated in FIG. 4, the adjacent vanes 64 converge inwardly, defining inwardly converging channels which help increase the velocity of the air injected through these channels. The inwardly moving air passing through the gap 63 is intersected by the upwardly moving air passing through the inlet ports 14 and is drawn up with this air into the vanes of the rotor assembly 20. The rotor assembly 20 thus drives particulates out of the air along the inner surface of the cylindrical side wall 51 until the particulates (including water droplets) are discharged through the discharge port 61.

In the operation of the precleaner 10, air that may contain particulate matter is typically drawn into the precleaner by vacuum pressure caused by an engine or similar device mounted below the air outlet port 16 of the precleaner 10. The air is thus drawn through the air inlet ports 14 and through the gap 63, the angling of the web supports 28 and of the vanes 64 directing the air flow in a circular, counterclockwise direction within the precleaner 10. The air flow is directed against the blades 78 and 80, and the tabs 83, of the rotor assembly 20, thus causing the rotor assembly 20 to spin in a counterclockwise direction. Of course, the direction of the web supports 28 and the vanes 64 could be reversed, and the orientation of the parts of the rotor assembly 20 reversed, to provide rotation in the clockwise direction. The circular motion of the rotor assembly 20 impels the intake air into a circular motion, causing a centrifugal force to be exerted on particulates within the air that has been drawn into the precleaner 10. The particulates are thus flung outwardly against the inner cylindrical surface of the side wall 51 of the hood. The configuration of the hood 18 forces particulates along the interior of the hood surface toward the vertically extending slot that forms the discharge port 61. Of course, other discharge port configurations may be used, as illustrated, for example, in Pat. Nos. 5,022,903, 5,449,391, and 5,505,756.

The above described precleaner of the present invention is an effective means of pre-cleaning air that is to be introduced into an engine, air compressor, or similar apparatus, and is efficient even at high altitudes. It is to be understood that the precleaner 10 of the present invention is not limited merely to applications with air and to those applications that remove particles that are typically contained within air. The precleaner 10 will work in applications involving other fluids as well. Though the figures and the corresponding text have for example, assigned a "top" and a "bottom", and corresponding identifying labels to the precleaner 10, these have been used for illustrative purposes inasmuch as the air precleaner can be mounted and will function in any position. Further, although the air inlet ports 14, the rotor assembly 20, and the vanes 64 have been depicted to cause air flow and rotation of the rotor assembly 20 and particulate discharge in a counterclockwise direction, a precleaner with air flow and rotation of the rotor assembly and discharge of particles in a clockwise direction is, as noted above, within the scope of the present invention.

Figure 6:
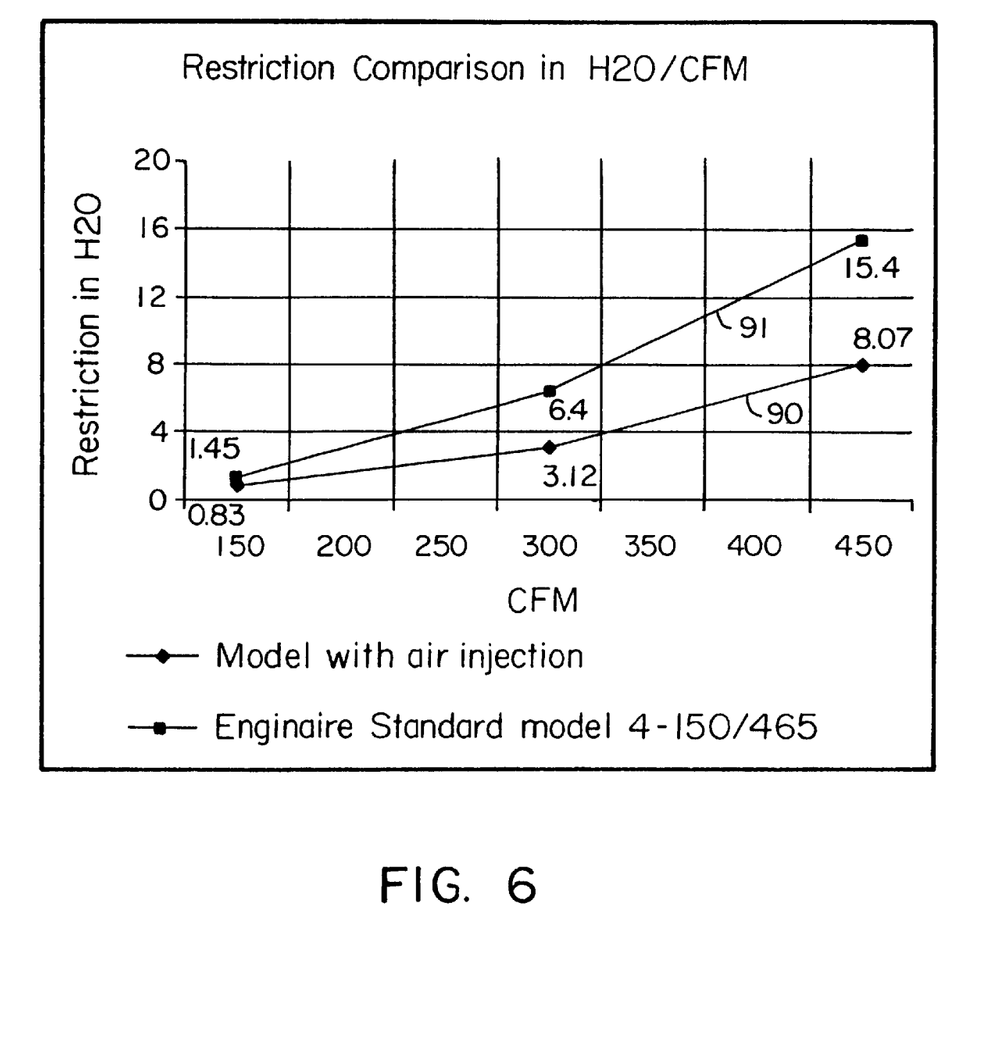
FIG. 6 are graphs illustrating air intake restrictions for the air precleaner with side air injection in accordance with the invention and for an air precleaner without side air injection.

A comparison of the operation of an air precleaner with side air injection in accordance with the invention with that of a conventional air precleaner of similar design is shown in FIG. 6. FIG. 6 is a graph of restriction (pressure drop) in inches of water across the precleaner as a function of air flow in cubic feet per minute. The line labeled 90 represents data taken with the air precleaner of the invention having the design shown in FIGS. 1–5 with a hood and base assembly diameter of 9 inches, a gap width of 0.5 inch, and vanes 64 mounted at an angle of about 35° with respect to a tangent to the periphery of the hood. The line labeled 91 represents data taken with a conventional air precleaner having an identical construction of the hood and base assembly but with no gap between the hood and base assembly so that all air flow into the precleaner is through the inlet ports defined between the web supports at the bottom of the precleaner. Testing was conducted in accordance with SAE J726 Jun 93 Air air flow rate standard. As seen in FIG. 6, significantly reduced air flow restriction, and thus significantly reduced energy required to power the air precleaner, is obtained with the air precleaner of the present invention at all air flow rates. A reduction in restriction of approximately one-half from the conventional precleaner design is obtained. Nonetheless, high efficiency, typically greater than 80% dust removal, is obtained with the air precleaner of the invention.

The air precleaner of the invention may also be formed so that all of the air intake to the precleaner is through the channels defined by the vanes 64 at the circumferential periphery of the precleaner. With reference to FIGS. 7–10, the precleaner of the invention is illustrated with a series of flanges 53' to which the vanes 64 are mounted in a series around the periphery of the precleaner at the gap 63. As best illustrated in FIG. 8 and in the cross-sectional view of FIG. 10, the bottom of the precleaner is closed by a plate 95 which extends from the inner circumferential wall 24 to the periphery of the precleaner, thereby enclosing the air space within the precleaner at the bottom. All air intake is thus through the channels defined between the vanes 64. As illustrated in the cross-sectional view of FIG. 10, the vanes 64 direct air into the enclosed air space within the precleaner with both a radially inward and a tangential component of velocity, and the tangential component of velocity of this incoming air impacts on the rotor assembly to drive the rotor in rotation in the desired direction. Because all of the air enters from the circumference of the precleaner, the precleaner can be mounted directly adjacent to other surfaces, e.g., on the hood of a vehicle, to minimize the profile of and the space occupied by the precleaner. It is apparent that if the precleaner is mounted directly onto another surface, particularly a flat vehicle hood, the plate 95 may be defined by the surface itself, such as the hood of the vehicle, rather than being a separate part. In appropriate circumstances, a gasket (not shown) may be mounted between the precleaner and the hood or other surface to provide an airtight bottom enclosure for the precleaner, if desired, or to buffer the contact between the precleaner and the surface on which it is mounted.

Figure 7:
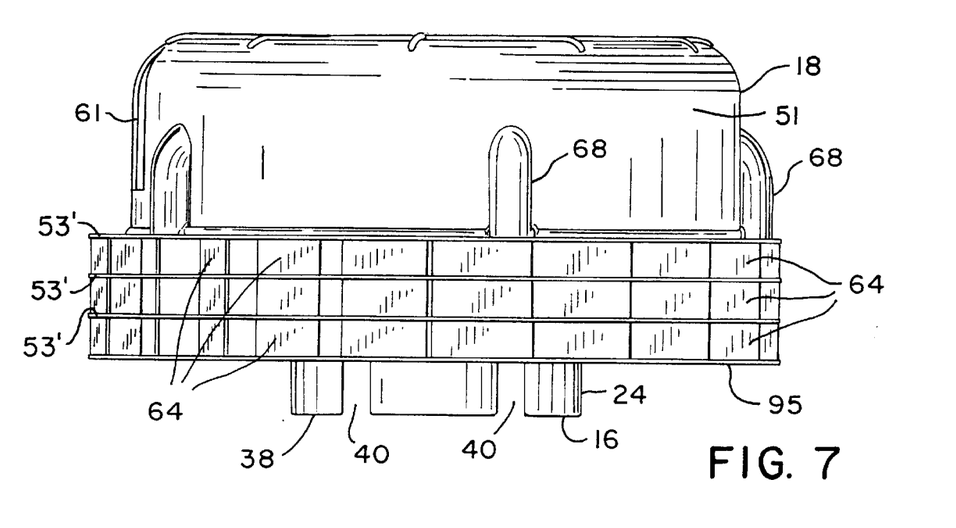
FIG. 7 is a side view of an air precleaner in accordance with the invention in which air intake may be entirely from the circumferential periphery of the air precleaner.
Figure 8:
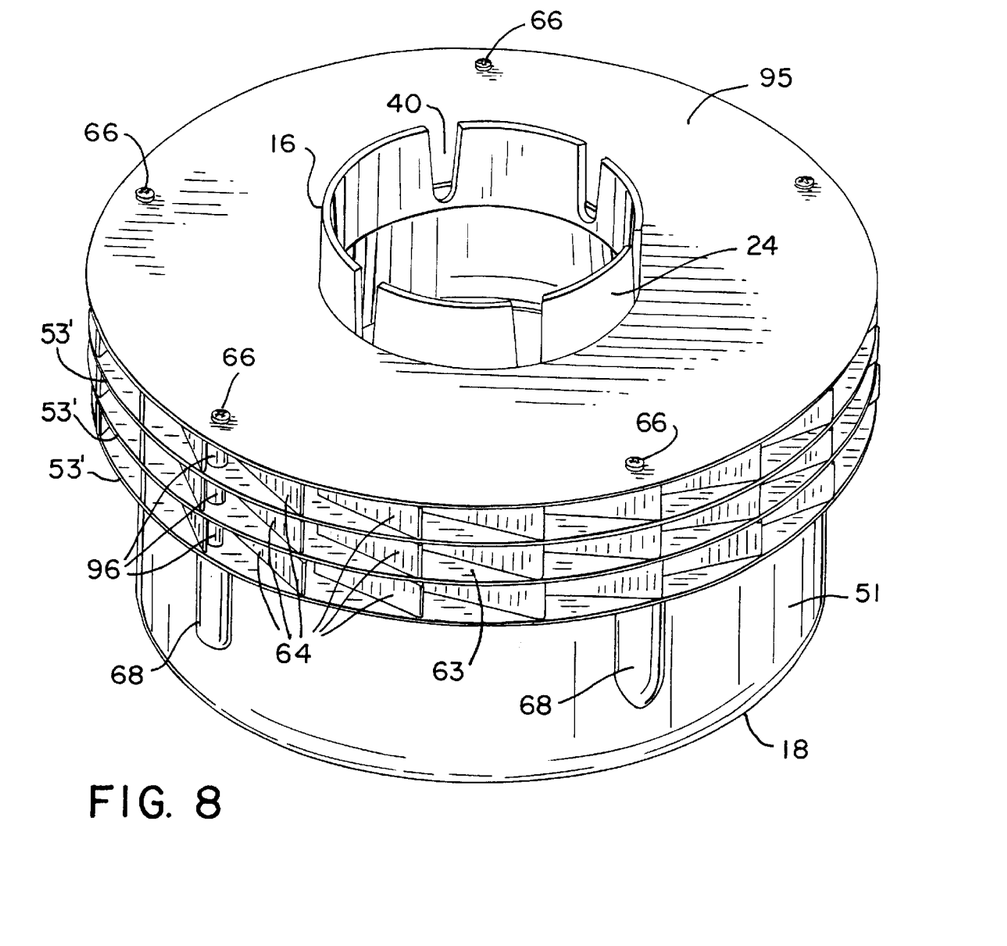
FIG. 8 is a perspective view of the air precleaner of FIG. 7.
Figure 9:
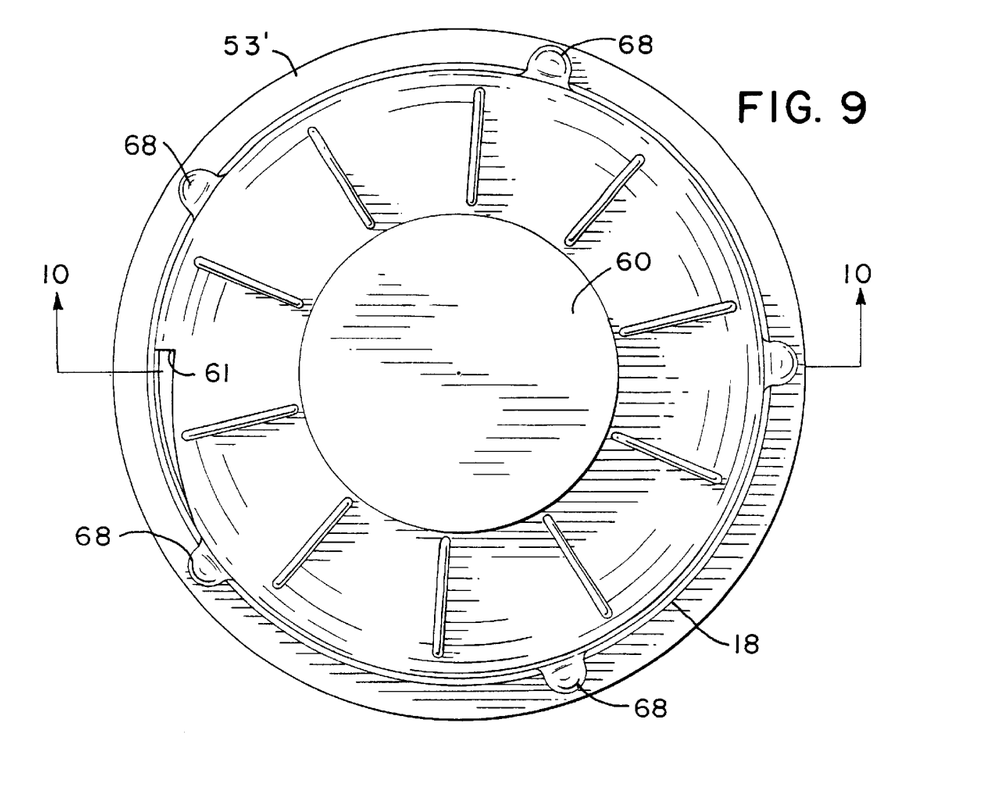
FIG. 9 is a top view of the air precleaner of FIG. 7.
Figure 10:
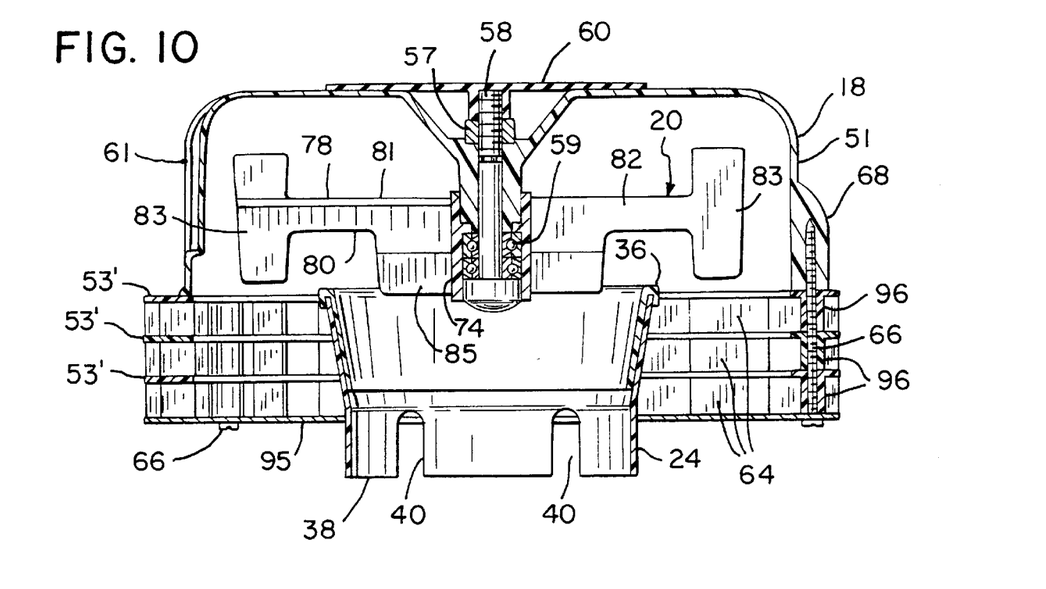
FIG. 10 is a cross-sectional view of the air precleaner of FIG. 7 taken generally along the lines 10—10 of FIG. 9.

In the precleaner as illustrated in FIGS. 7–10, the flanges 53' are formed separately from the hood 18, e.g., as a circular ring, and a series of equally spaced vanes 64 are attached to each of the flanges 53', for example, by being integrally molded therewith of a durable plastic. A single one of the flanges 53' with the vanes 64 attached thereto may be mounted to the hood 18 where a single layer of the vanes will provide adequate air intake. Of course, the separate flange 53' with the vanes mounted thereto may be utilized in conjunction with the bottom air intake utilizing the web supports 28 of FIG. 1. An advantage of the separate flange rings 53' with the series of vanes 64 attached thereto is that a selected number of such flanges may be stacked together as illustrated in FIGS. 7, 8, and 10 (showing three flange and vane units stacked together). However, it is understood that more or less of the flange and vane units may be utilized. The number of units used in the stack may be selected to provide a desired total air intake area, which is a significant factor in the restriction of the air being drawn into the air precleaner. The flange and vane units may be standardized so that a precleaner for a specific application, which requires a particular number of the units in the stack, may be simply assembled from the standard parts. For example, as illustrated in FIG. 10, the flange ring and vane units may be formed so that the bolts 66 may be threaded through each of the units and into the hood, such as at the tapped receptacles 68 on the hood 18. Preferably, circular ferrules 96 are formed integrally with each of the flanges 53' to provide a guide for the bolts 66 and to allow the stack of flange and vane units to be engaged tightly together but spaced apart appropriately by the ferrules 96.

It is further understood that the invention is not confined to the particular construction and arrangement of parts herein illustrated and described, but embraces such modified forms thereof as come within the scope of the following claims.

What is claimed is:

1. An air precleaner that separates particulates from air, comprising:

(a) a base assembly having an inlet port through which air enters the precleaner;

(b) a hood mounted to the base assembly and having a discharge port for discharging particulates, the hood and base assembly defining an air space, a circumferential gap between the hood and base assembly, and a series of vanes mounted in the gap at an angle between radial and tangential to define channels between the vanes through which air is directed into the air space; and (c) a rotor assembly that is rotatably mounted within the air space that rotates to fling particulates outward toward the hood for expulsion through the discharge port.

2. The air precleaner of claim 1 wherein the base assembly further comprises an inner circumferential wall that defines the outlet ports and that terminates in an inner end, and a plate extending from the inner circumferential wall to the vanes to close off the air space beneath the hood such that air may enter the air space in the air precleaner only through the channels defined by the vanes.

3. The air precleaner of claim 1 including a flange extending outwardly from the periphery of the hood at the gap and wherein the vanes are attached to the flange.

4. The air precleaner of claim 3 wherein there are a plurality of flanges, a series of vanes attached to each flange, and wherein the plurality of flanges with vanes attached thereto are mounted in stacked relation in the gap.

5. The air precleaner of claim 4 wherein the base assembly further comprises an inner circumferential wall that defines the outlet port and that terminates in an inner end, and a plate extending from the inner circumferential wall.

6. The air precleaner of claim 1 wherein the vanes in the series of vanes are equally spaced from one another around the periphery of the gap to define inwardly converging channels between the vanes.

7. The air precleaner of claim 6 wherein each vane is formed of a flat plate.

8. The precleaner of claim 1 wherein the rotor assembly is mounted to the inside of the hood at a position above the position of the gap.

9. The air precleaner of claim 1 wherein the hood has a cylindrical shaped sidewall and the discharge port is formed as a slot in the sidewall.

10. The air precleaner of claim 1 wherein the rotor assembly further includes an axle mounted to the hood, a hub that is rotatably mounted upon the axle, and an arm that is attached to the hub in the path of air entering through the channels between the vanes, the air causing the hub to rotate upon the axle and the arm to fling particulates outwardly, wherein the arm includes at least a blade that is in a plane axial to the hub.

11. The air precleaner of claim 10 wherein the axial blade further includes a tab that extends downward from the blade proximate to the hub, and wherein the tab is bent in a direction against the rotation of the rotor assembly.

12. The air precleaner of claim 11 wherein there are four arms attached to the hub, each of the arms being an equal distance from the others.

13. An air precleaner that separates particulates from air, comprising:
   (a) a hood with a cylindrical sidewall and having a discharge port for discharging particulates;
   (b) a base assembly having an inner circumferential wall that terminates in an inner end and that defines an outlet port through which air exits the precleaner, the hood and base assembly defining an air space, a plate extending outwardly from the inner circumferential wall to close off the air space beneath the hood, the hood spaced from the base assembly to define a circumferential gap, and a series of equally spaced vanes mounted in the gap at an angle between radial and tangential to define channels between the vanes through which air is directed into the air space; and
   (c) a rotor assembly that is rotatably mounted within the air space and that rotates when air enters through the channels between the vanes to fling particulates outward toward the hood for expulsion through the discharge port.

14. The air precleaner of claim 13 including a flange extending outwardly from the periphery of the hood at the gap and wherein the vanes are attached to the flange.

15. The air precleaner of claim 13 wherein there are a plurality of flanges, and wherein a series of vanes are attached to each flange, and wherein the plurality of flanges with vanes attached thereto are mounted in stacked relation in the gap.

16. The air precleaner of claim 13 wherein the vanes in the series of vanes are equally spaced from one another around the periphery of the gap to define inwardly converging channels between the vanes.

17. The air precleaner of claim 13 wherein each vane is formed of a flat plate.

18. The precleaner of claim 13 wherein the rotor assembly is mounted to the inside of the hood at a position above the position of the gap.

19. The air precleaner of claim 13 wherein the discharge port is formed as a slot in the cylindrical sidewall of the hood.

20. The air precleaner of claim 13 wherein the rotor assembly further includes an axle mounted to the hood, a hub that is rotatably mounted upon the axle, and an arm that is attached to the hub in the path of air entering through the channels between the vanes, the air causing the hub to rotate upon the axle and the arm to fling particulates outwardly, wherein the arm includes at least a blade that is in a plane axial to the hub.

21. The air precleaner of claim 20 wherein the axial blade further includes a tab that extends downward from the blade proximate to the hub, and wherein the tab is bent in a direction against the rotation of the rotor assembly.

22. The air precleaner of claim 20 wherein there are four arms attached to the hub, each of the arms being an equal distance from the others.

23. An air precleaner that separates particulates from air, comprising:
   (a) a base assembly having an inlet port through which air enters the precleaner, and an outlet port through which air exits the precleaner;
   (b) a hood mounted to the base assembly and having a discharge port for discharging particulates, the hood and base assembly defining an air space so that the air space and the inlet and outlet ports and the discharge port are in fluid communication, the hood spaced from the base assembly to define a circumferential gap, and a series of vanes mounted in the gap at an angle between radial and tangential to define channels between the vanes through which air is directed into the air space; and
   (c) a rotor assembly that is rotatably mounted within the air space and that rotates when air enters through the inlet port to fling particulates outward toward the hood for expulsion through the discharge port.

24. The air precleaner of claim 23 wherein the vanes in the series of vanes are equally spaced from one another around the periphery of the gap between the hood and the base assembly to define inwardly converging channels between the vanes.

25. The air precleaner of claim 24 wherein each vane is formed of a flat plate.

26. The air precleaner of claim 24 including a flange extending outwardly from the periphery of the hood at the gap and wherein the vanes are attached to the flange.

27. The air precleaner of claim 26 wherein the vanes extend outwardly from the inner periphery of the hood at the gap to an outer periphery of the flange.

28. The air precleaner of claim 23 wherein the rotor assembly is mounted to the inside of the hood at a position above the position of the gap between the hood and base assembly.

29. The air precleaner of claim 23 wherein the base assembly further comprises an inner circumferential wall that defines the outlet port and that terminates in an inner end, and an outer circumferential wall that is connected to the inner circumferential wall by web supports, wherein there are a plurality of inlet ports defined by the web supports, the web supports being angled to direct air upon the rotor assembly to cause the rotor assembly to rotate, and wherein the gap between the hood and base assembly is at a position below the inner end of the wall that defines the outlet port.

30. The air precleaner of claim 23 wherein the hood has a cylindrical shaped side wall and the discharge port is formed as a slot in the side wall.

31. The air precleaner of claim 23 wherein the rotor assembly further includes an axle mounted to the hood, a hub that is rotatably mounted upon the axle, and an arm that is attached to the hub in the path of air entering through the inlet port and the gap, the air causing the hub to rotate upon the axle and the arm to fling particulates outward, wherein the arm includes at least a blade that is in a plane axial to the hub.

32. The air precleaner of claim 31 wherein the axial blade further includes a tab that extends downward from the blade proximate to the hub, and wherein the tan is bent in a direction against the rotation of the rotor assembly.

33. The air precleaner of claim 31 wherein there are four arms attached to the hub, each of the arms being equal distant from the others.

34. The air precleaner of claim 33 wherein each arm further includes a paddle extending outwardly generally in an axial plane from an outer end of the axial blade, and wherein each paddle is in the plane of the axial blade and has a larger axial dimension than the axial dimension of the axial blade from which the paddle extends, and wherein each arm includes a radial blade mounted to the hub in a plane radial to the hub and which is wedge shaped and tapers from the widest dimension of the radial blade where the radial blade joins the hub to terminate at a position meeting the axial blade, and wherein the radial blade extends from a front side of the axial blade in a direction corresponding to the direction of hub rotation and a backside of the axial blade is free of obstruction so that air flowing past the backside of the axial blade is substantially unobstructed.

35. An air precleaner that separates particulates from air, comprising:
(a) a base assembly having an inlet port through which air enters the precleaner, and an outlet port through which air exits the precleaner;
(b) a hood with a cylindrical side wall mounted to the base assembly and having a discharge port for discharging particulates formed as a slot in the side wall, the hood and the base assembly defining an air space so that the air space and the inlet and outlet ports and the discharge port are in fluid communication, the hood spaced from the base assembly to a circumferential gap, and a series of equally spaced vanes mounted in the gap at an angle between radial and tangential to define inwardly converging channels between the vanes through which air is directed into the air space; and
(c) a rotor assembly that is rotatably mounted within the air space and that rotates when air enters through the inlet port to fling particulates outward toward the hood for expulsion through the discharge port, wherein the rotor assembly further includes an axle mounted to the hood, a hub that is rotatably mounted upon the axle, and a plurality of arms attached to the hub in the path of air entering through the inlet port and the gap, the air causing the hub to rotate upon the axle and the arms to fling particulates outward, wherein the arms include each at least a blade that is in a plane axial to the hub.

36. The air precleaner of claim 35 wherein each vane is formed of a flat plate.

37. The air precleaner of claim 35 including a flange extending outwardly from the periphery of the hood at the gap and wherein the vanes are attached to the flange.

38. The air precleaner of claim 37 wherein the vanes extend outwardly from an inner periphery of the hood at the gap to an outer periphery of the flange.

39. The air precleaner of claim 37 wherein the rotor assembly is mounted to the inside of the hood at a position above the position of the gap between the hood and base assembly.

40. The air precleaner of claim 37 wherein the base assembly further comprises an inner circumferential wall that defines the outlet port and that terminates in an inner end, and an outer circumferential wall that is connected to the inner circumferential wall by web supports, wherein there are a plurality of inlet ports defined by the web supports, the web supports being angled to direct air upon the rotor assembly to cause the rotor assembly to rotate, and wherein the gap between the hood and base assembly is at a position below the inner end of the wall that defines the outlet port.

41. The air precleaner of claim 37 wherein the axial blade further includes a tab that extends downward from the blade proximate to the hub, and wherein the tab is bent in a direction against the rotation of the rotor assembly.

42. The air precleaner of claim 37 wherein there are four arms attached to the hub, each of the arms being equal distant from the others.

43. The air precleaner of claim 42 wherein each arm further includes a paddle extending outwardly generally in an axial plane from an outer end of the axial blade, and wherein each paddle is in the plane of the axial blade and has a larger axial dimension than the axial dimension of the axial blade from which it extends, and wherein each arm includes a radial blade mounted to the hub in a plane radial to the hub and which is wedge shaped and tapers from the widest dimension of the radial blade where the radial blade joins the hub to terminate at a position meeting the axial blade, and wherein the radial blade extends from a front side of the axial blade in a direction corresponding to the direction of hub rotation and a backside of the axial blade is free of obstruction so that air flowing past the backside of the axial blade is substantially unobstructed.

* * * * *